July 8, 1958
C. H. NEELY
2,842,651
PORTABLE HEATED ANIMAL BED
Filed July 5, 1955
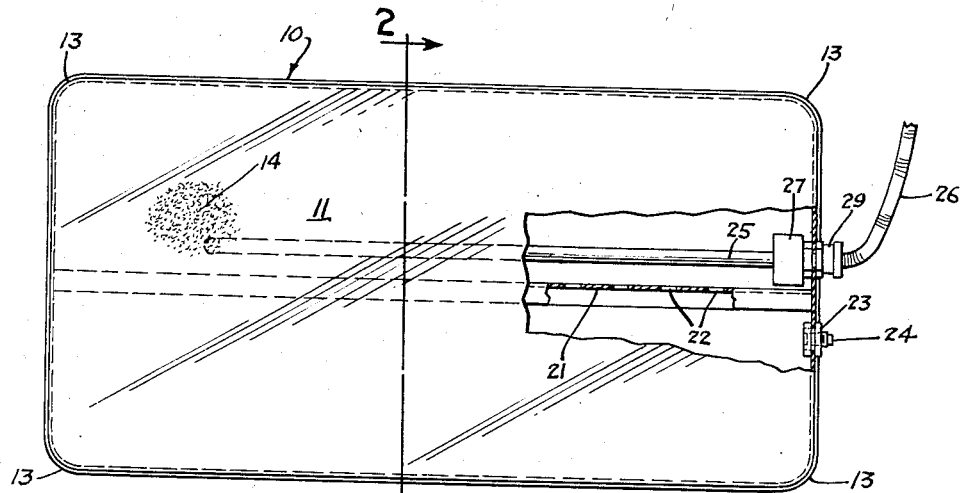
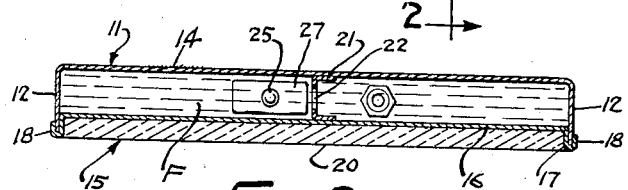
Fig.1
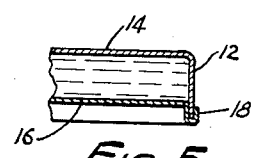
Fig.5
Fig.3
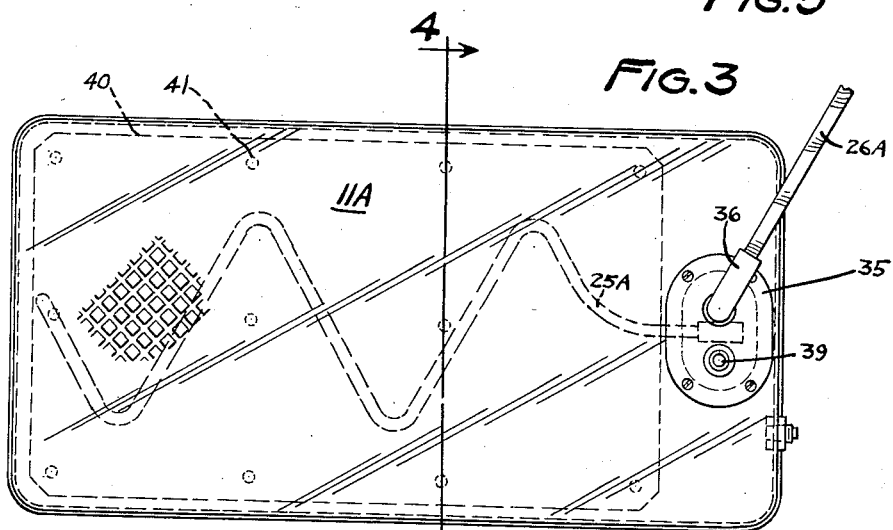
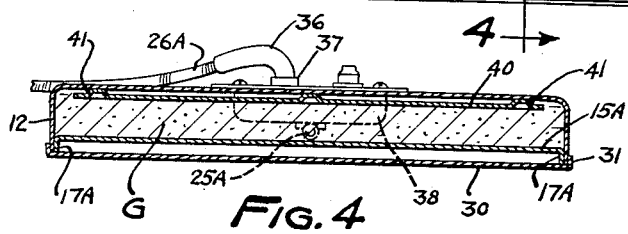
Fig.4
INVENTOR.
CARROLL H. NEELY
BY
ATTORNEYS – # United States Patent Office 2,842,651
Patented July 8, 1958

2,842,651

PORTABLE HEATED ANIMAL BED

Carroll H. Neely, Cresco, Iowa

Application July 5, 1955, Serial No. 520,084

8 Claims. (Cl. 219—19)

This invention relates to heated animal beds and is an improvement over the structure of my co-pending application, Serial No. 510,429, filed May 23, 1955.

Broadly speaking, the invention relates to improvements in a portable heated animal bed providing a corrosion resistant, moisture impervious heated planar surface, particularly for the warming of young animals, such as newly farrowed pigs.

Objects of the present invention are to provide new and useful improvements in heated animal beds having a planar extending surface uniformly heated throughout its extension by an embedded electrical wiring; the surface being relatively chemically inert, resistant to moisture and chemicals; and providing a relatively portable, easily utilizable, inexpensive structure.

Other and further objects of the invention reside in the specific structural construction of the animal bed as shown and described; and still further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, but these are indicative, however, of but a few of the various ways in which the principles of the invention may be employed.

In the drawings, Figure 1 is a top plan view partially broken away, of the instant invention;

Figure 2 is a vertical sectional view taken along the line and in the direction of the arrows 2—2 of Figure 1;

Figure 3 is a view similar to Figure 1 but showing a slightly modified form of the instant invention;

Figure 4 is a vertical sectional view taken along the line and in the direction of the arrows 4—4 of Figure 3; and Figure 5 is a fragmentary vertical sectional view showing a second modification of the invention.

With reference to the drawings and particularly with reference to Figure 1, there is shown the bed generally designated 10 comprising a metallic shell, usually of suitable steel. The shell comprises a top planar surface 11 and has a plurality of rounded corners 13 and a peripheral vertical wall 12. As shown in Figure 1, the exterior surface 11 is provided with a bonded coating 14 of paint or other material providing a non-skid surface. Thus, synthetic resinous materials, lacquer, paint, paint including granulametric materials, such as fine sand particles, etc., may be used to provide a non-skid surface 14. For clarity of disclosure, only a portion of the surface 14 is illustrated in Figure 1.

Secured to the bottom edge of the peripheral upright wall 12 is a closure member 15 having a planar surface 16 and a depending peripheral edge 17 upwardly curved as at 18, thus providing a rolled edge for joining the closure member 15 to the wall 12. The wall 12 is positioned in the upwardly turned portions 18 as shown in Figure 2 and secured thereto by suitable means such as silver soldering or copper brazing. In addition, it may be spot welded thereto or otherwise secured as desired, to provide a strong, secure and fluid-tight seal.

There is thus provided a rigid unit, having the rounded corners which preclude sharp projections and give added strength; it will not absorb moisture and is able to withstand the heat or moisture commonly used in cleaning farrowing equipment, for which purpose this invention is particularly adaptable, for hot lye water and steam cleaning are common methods of cleaning such equipment to comply with the high sanitation standards required in the raising of pigs.

Secured within the upwardly directed or dished portion formed by portions 16 and 17 of closure member 15 is a sheet of insulation material 20 bonded to the underside of planar portion 16 by suitable adhesive or other means. The insulation material 20 may be fibrous insulation, mineral insulation such as asbestos, or synthetic resinous insulation such as foamed polystyrene, or foamed polyethylene, or other insulation material. Preferably it should be light in weight and relatively chemically inert and moisture resistant, yet be rigid enough to provide additional supporting strength for the bed 10. The insulation may be adhesively or otherwise secured thereto.

Central channel member 21 extends longitudinally of the bed as shown in Figure 1 and has one horizontal flange joined to portion 16 and the other horizontal flange joined to the underside of member 11. This channel member 21 provides support and rigidity for the bed. A plurality of apertures 22 is provided in channel member 21 to permit the free flow of fluid throughout the interior of the bed 10.

A fill and drain plug 23 is provided at one end of the bed in the wall 12 as shown in Figure 2 and has a removable threaded cap 24 through which mobile material, usually fluid F such as oil or water, may be introduced into the bed.

An elongated electrical heating element 25 is supported by end wall 12 and positioned to extend within the cavity between members 14 and 16. Element 25 is secured to wall 12 so as to provide a fluid-tight connection and is provided with a lead wire 26 secured to a suitable source of electric current. The heating element 25 is provided with a built-in thermostat 27 which will control the amount of heat supplied to the fluid F within the bed and consequently the temperature of the surface 14. The lead wire 26 may be flexible synthetic resinous hose such as polyethylene or vinyl resin, or it may be a spring wound wire and is protected at the entrance to the bed 10 by a ferrule 29 fixedly secured to the wall 12. In this instance element 25 is shown as extending about two-thirds (⅔) the length of the bed, but it may be shortened or lengthened as desired. Further, in some instances it may be desirable to provide a support or spacer for the free end of element 25, such as an insulation block to insure that it will remain approximately parallel to planar surfaces 11 and 16.

Thus, the bed comprises a sheet of insulating material or insulation means over which there is superimposed a chamber, usually rectangular, providing a fluid-tight container into which a quantity of mobile heat transferring material is adapted to be inserted, and providing a top planar supporting and warming surface which may be provided with a skid resistant coating. The chamber will usually comprise a suitable metal shell heated by an electric resistant element, usually provided with a thermostat.

If desired, and contemplated within the spirit and scope of this invention, the element 25 may be further elongated or serpentined, as shown for element 25A in Figures 3 and 4, and the mobile heat transmitting material, instead of being oil or water may be dry sand G, or other comminuted material or granularmetric heat transferring material.

In Figures 3 and 4 there is shown a modification of the invention in which the surface 11A is patterned so as to provide an anti-skid surface without the necessity of the application of paint, lacquer, etc. In Figure 3, for clarity of drawing, only a small section of patterning has been illustrated, but it is to be understood that the entire surface 11A may be patterned; selected portions and various patterns may be used.

The closure member 15A of Figures 3 and 4 has a downwardly depending peripheral wall 17A but has no upturned portion similar to portion 18 for the modification of Figures 1 and 2. In this modification a spaced wall member 30 is provided with an upturned peripheral portion 31 positioned outside of and in juxtaposition to wall 12 and secured thereto. Thus, in this modification, members 30 and 15A provide a dead air space with entrapped air, therebetween, providing effective insulation.

Also, in this modification, the surface 11A is apertured to receive a cover plate 35 screwed thereto, the cover plate receiving the cord or wire 26A, having an L-guard 36 secured to ferrule 37. The cover plate supports a housing 38 in which is positioned a thermostat, a small electric bulb visible through an inspection plate 39 for indicating flow of current to the bed and from which is supported the heating element 25A. Further, this cover plate 35 may be positioned in the vertical wall 12 similar to the positioning of ferrule 29, and an appropriate gasket provided if necessary.

A reinforcing sheet member 40 extending as shown in the dotted line position in Figure 3, is provided with a plurality of dimples 41 and is spot-welded to the member 11A for reinforcement thereof. The element 25A is shown as an elongated serpentined element, but may take other forms as preferred. Also, while it is shown as resting on 15A, suitable supporting or insulating spacers may be used to elevate or space it if preferred. The mobile heat-transmitting material is in this instance sand, although other comminuted or granularmetric material may be used.

In the modification shown in Figure 5, the insulation 20 of the modification of Figures 1–2 has been left off and the bed will rest upon the supporting surface on peripheral edge 17, thus forming a dead air space between the supporting surface and member 16, providing adequate insulation.

In operation, whether the modification of Figures 1–3, 3–4 or 5 be used, the surface 11A will be uniformly heated by the element 25 or 25A through the fluid F or sand G, thus making a warm dry bed of uniform temperature and which will vaporize any moisture which may be present on the top surface of the bed from pigs or other animals. Further, heating the top surface will warm the air by contact and the air will rise and warm the sides and the backs of the animals.

As many widely differing embodiments of this invention may be made without departing from the spirit and scope thereof, it is to be understood that the specific embodiments described are given by way of example only and the invention is limited only by the terms of the appended claims.

What is claimed:

1. An animal bed comprising in combination a shell, said shell having a planar substantially unobstructed top portion, said top portion partially supported by a reinforcing member, a peripheral upright wall provided with rounded corners joined thereto forming a dished member, a closure member secured to the edges of said peripheral upright wall in fluid-tight relation, an elongated electrical resistance element disposed within the chamber formed thereby, a thermostat for controlling the amount of electricity supplied to said resistant element, and insulation means positioned exterior of and below said closure member.

2. The structure of claim 1 further characterized by said closure member providing a downwardly turned recess and a peripheral supporting edge the lower end of said peripheral supporting edge having an outwardly extending U-shaped rim for supporting the peripheral upright wall of said shell.

3. An animal bed comprising a fluid-tight container providing a substantially unobstructed extending planar surface, a liquid heat transferring material positioned within said container and electrical means disposed within said container for heating said liquid material, said container comprising a downwardly dished member, and a downwardly dished closure member secured thereto and providing a downwardly turned recess, and a substantially continuous peripheral edge adjacent thereto for supporting said container.

4. An animal bed comprising a fluid-tight container having a substantially unobstructed top planar surface, said top planar surface supported by a longitudinally extending channel member positioned within said container and having a plurality of apertures therein, a liquid heat transferring material contained within said container and an electrical resistance element disposed within said container for heating said liquid heat transferring material, a thermostat for controlling the amount of electricity supplied thereto, said container comprising a downwardly dished member and a downwardly dished closure member secured thereto and providing a downwardly turned recess, and a substantially continuous peripheral edge adjacent thereto for supporting said container.

5. The structure of claim 4 further characterized in that said top planar surface comprises a granularmetric skid-proof material.

6. The structure of claim 4 further characterized by an insulating material positioned below said fluid-tight container and within said recess and substantially continuous peripheral edge.

7. An animal bed comprising a fluid-tight container having a substantially unobstructed top planar surface, the outwardly extending face of said planar surface having a coating of granularmetric materials thereon, a peripheral upright wall extending downwardly from said planar surface provided with rounded corners joined thereto, a closure member positioned below said top planar surface secured within the said peripheral wall in fluid-tight relation forming the bottom of said fluid-tight container, said closure member comprising a downwardly turned recess and peripheral supporting edge, the lower end of said peripheral supporting edge having an outwardly extending U-shaped rim for seating the peripheral upright wall extending downward from said planar surface, insulation means contained within said recess and peripheral supporting edge, a longitudinally extending channel member positioned within said container for supporting said top planar surface, a liquid heat transferring material contained within said container, an electrical heating element disposed within said container and liquid heat transferring material for heating the same, and a thermostat for controlling the amount of electricity supplied to said resistance element.

8. An animal bed comprising in combination a fluid-tight container having a peripheral wall, an upright peripheral wall integrally joined to the peripheral wall of said container and extending downwardly from said container for supporting the same, insulating means contained within said upright peripheral wall and below said container, said container having in subcombination a top planar surface, the exterior of said planar surface coated with a granularmetric material, a liquid heat transferring material contained within said container and a thermostatically controlled electric heating element positioned within said container for heating said liquid heat transferring material, a downwardly dished closure member secured in fluid-tight relation to said peripheral wall of said container and forming the bottom thereof, said closure member having a downwardly extending peripheral edge positioned contiguous with said upright peripheral wall and insulating means.

References Cited in the file of this patent

UNITED STATES PATENTS

| | | |
|---|---|---|
| 1,025,144 | Kuhn | May 7, 1912 |
| 1,994,759 | Dermott | Mar. 19, 1935 |
| 2,363,735 | Lord | Nov. 28, 1944 |
| 2,411,677 | Christenson | Nov. 26, 1946 |
| 2,513,733 | Morris | July 4, 1950 |
| 2,617,005 | Jorgensen | Nov. 4, 1952 |
| 2,702,334 | Kleist | Feb. 15, 1955 |